March 11, 1969  H. C. TSIEN  3,431,771
UNIVERSAL DIFFUSION-SORPTION TYPE GAS ANALYZER
Filed March 11, 1965
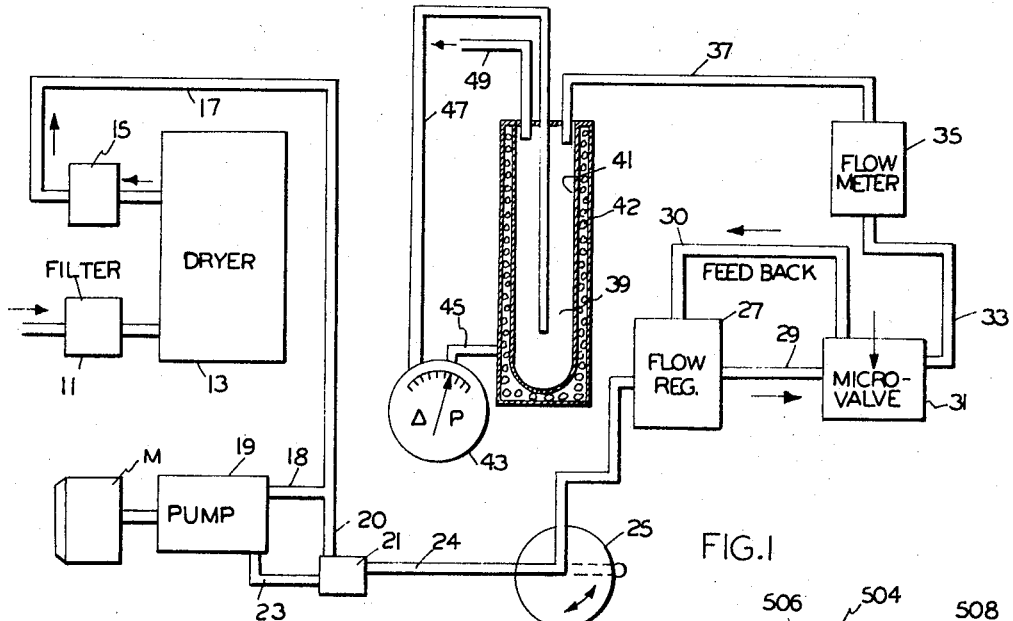
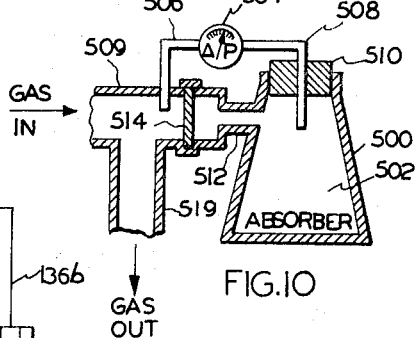
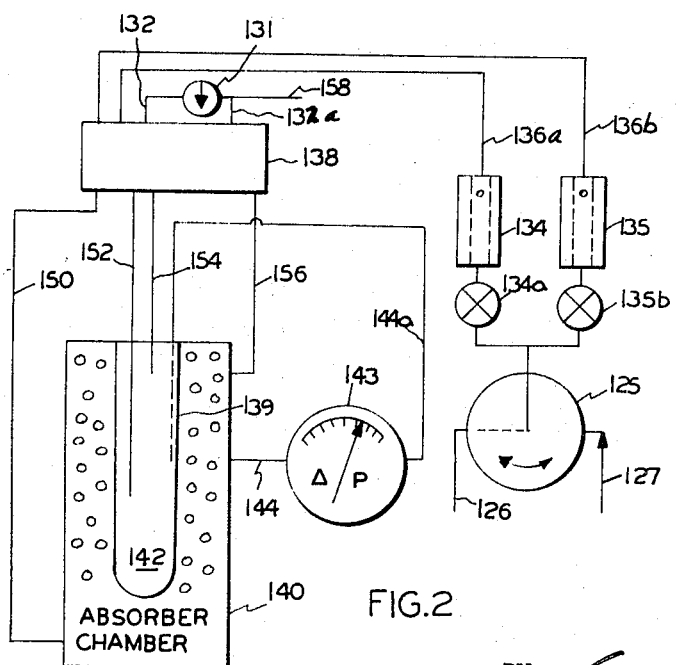
INVENTOR
HSUE C. TSIEN
ATTORNEY

INVENTOR
HSUE C. TSIEN

United States Patent Office

3,431,771
Patented Mar. 11, 1969

3,431,771
UNIVERSAL DIFFUSION-SORPTION TYPE
GAS ANALYZER
Hsue C. Tsien, Livingston, N.J., assignor to Esso Research
and Engineering Company, a corporation of Delaware
Filed Mar. 11, 1965, Ser. No. 438,841
U.S. Cl. 73—23                                3 Claims
Int. Cl. C01n 31/06

ABSTRACT OF THE DISCLOSURE

The disclosure is to an instrument used for the qualitative and quantitative detection of a gas in a mixture of various gases. The gas under test is admitted to the test device in a mixture of gases and is selectively absorbed by an absorbent after passing through a micro-porous element of accurately controlled porosity. Suitable means for measuring electrical resistance changes in the absorbent are provided whereby the proportions of the absorbable gas may be indicated.

---

The present invention relates to an improved universal diffusion-sorption type gas analyzer. It pertains particularly to an inexpensive analyzer suitable for wide-spread use. In its preferred form, the instrument is a relatively very simple device which is economical to manufacture and which can be used for the accurate detection of various gases. It can be used for qualitative analysis and, with suitable care, for analysis for quantitative purposes.

In the prior art a number of effective gas analyzers are available but these tend to be relatively quite expensive. According to the present invention, a much simpler device, which is still highly effective and of good accuracy, can be made with relatively few components. In a typical case, the diffusion-sorption analyzer of the present invention comprises primarily three relatively simple components, namely, a micro-porous element of accurately controlled porosity through which gases diffuse selectively, an adsorbent which selectively adsorbs a gas to be analyzed, and a simple differential pressure gauge. Additional refinements, of course, can be added if desired.

The present invention is based in part on the discovery that at constant total mass flow the differential pressure of gas between the inside and the outside of the micro-porous element is a linear function of the percentage composition of the sorbate gas. By choosing different sorbates and selecting suitable diffusion barriers various gases can be analyzed accurately and simply.

Another aspect of the invention involves the use of an intermittent bridge circuit type sorption analyzer which has only two chambers. Use is made of a differential pressure gauge to sense the difference in pressure between the two chambers. In operation, this gauge is used in a typical case to determine the pressure difference between the gas in a dummy or inactive chamber and that in the adsorbent chamber. This pressure differential is a function of the partial pressure of the sorbate gas, or can be made so when the time of the charging cycle is taken into consideration. In actual experiments the time of the charging cycle may be kept constant; hence, pressure differential is directly proportional to the percentage or sorbate gas.

While the invention can assume various forms, in each case, preferably, the mass flow of gas is maintained constant. This is done by employing a constant differential type flow controller which is obtainable on the market and which, per se, forms no part of the present invention. A micro-regulating valve is an essential element and such valves also are readily available on the market.

In its simplest aspects, the analyzer can be a mechanism of very few parts. It may consist of a container which is partially filled with an adsorbent, or even with a catalyst, which is particularly sensitive to the particular gas to be analyzed. The porous diffusion barrier is placed at the entrance to the receiving vessel or compartment for the sample gas. A differential pressure gauge, which shows the difference in pressure between the outside and the inside of the diffusion barrier, serves to indicate proportionally the amount of the gas which is being detected or analyzed. In another form, instead of using a micro-porous barrier element and diffusing the gas through it, a "gas flow" bridge may be formed wherein static pressure differential is measured by shutting off in synchronism both the intakes and outlets of both a dummy chamber and an adsorbent chamber. This delta pressure, or increment in pressure, under appropriate circumstances is equal to partial pressure in some cases or, in any case, is directly proportional to the partial pressure of the sorbate gas.

Various adsorbents for the gas being sensed or measured may be used, depending on the particular gas to be analyzed. For example, a sodium hydrate asbestos adsorbent material which is available on the market under the trade name "Ascarite" may be used for selectively adsorbing $CO_2$. The invention is particularly adaptable for detection of CO and $CO_2$, e.g., in automotive exhaust gases. A somewhat similar product sold under the trade name "Hopcalite," which is commonly used as a catalyst and consists of mixtures of oxides of manganese, silver, cobalt and copper, may be used to analyze for carbon monoxide. The apparatus also may be used, with suitable arrangement, for combining carbon monoxide with oxygen to form $CO_2$. Thereafter the carbon dioxide is absorbed selectively and measured.

Another adsorbent which can be used is a cobalt complex or chelate, sold under the trade name "Salcomine," which has been used in the past to absorb molecular oxygen from the air at ambient temperature. The oxygen can be stripped out of the adsorbent by heating the complex to an elevated temperature, for example, about 80° to 100° C.

In addition, various other materials may be used as adsorbents for particular gases. Thus certain polymers, such as polypropylene in film or pellet form, can be used to selectively adsorb hydrocarbon gases. Particles of polyvinyl chloride may be used for selective adsorption of certain halo-carbons. Certain of the mercury, zinc and copper compounds are known to absorb oxides of nitrogen preferentially and reversibly at ambient temperatures, or near ambient temperatures, and these may be used for the detection of the nitrogen oxides. Various other materials may be used for other gases, as will be apparent to those skilled in the art.

In all cases, the pressure differential $\Delta P$ between the inside and outside of the diffusion chamber is used as a function of the gas content or of that part of the gas that is selectively absorbed by the absorbent. The absorbent material is outside of the diffusion chamber.

In another form of the invention a liquid adsorbent may be used, being pumped into a chamber to maintain a constant head with an overflow at the top which returns to a reservoir. In this case a thin film or curtain of barrier material is used which may be hollow cylindrical in shape. In such case the absorbent barrier consists of liquid adsorbent and is made to flow between two ring-shaped electrodes while gas is introduced through the diffusion barrier and sorption takes place. This sorption changes the conductivity of the liquid and such change may be used to detect and measure the gas present.

In the latter type instrument a sample gas is preferably swirled into the analyzing chamber and is diffused through a porous barrier. It is then contacted to be reacted or adsorbed or chemi-sorbed by the liquid adsorbent. This sorption, reaction or adsorption changes the electrical conductivity of the liquid film, which film is being constantly renewed at a rather rapid rate. The analysis is one which responds to rapid changes. The electrodes through which current is conducted to the liquid film are connected to a Wheatstone bridge. Unbalance in the bridge is measured as a change of the conductivity of the fluid. This obviously can be directly calibrated to read in percentage of gas analyzed, if desired.

The invention will be more fully understood by reference to the accompanying drawings and to the detailed description thereof which follows. Referring to the drawings, which form a part of this specification, FIG. 1 is a diagrammatic view of a preferred system which includes means for conditioning or scrubbing a gas.

FIG. 2 is a diagrammatic view of another system which also may include a scrubber.

FIG. 10 is a sectional view of another embodiment.

Figure 3:
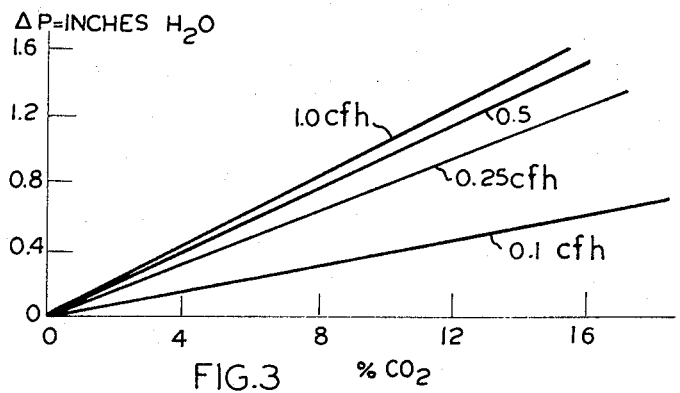
FIGS. 3 and 4 are graphic illustrations of typical results of the operation of the devices of FIGS. 1 and 2.

Referring now to FIG. 1, a universal diffusion-sorption type gas analyzer is represented. This is particularly suitable for analyzing a contaminated gas such as that from an automobile exhaust system which usually contains CO, $CO_2$, and other products. The sample gas first passes through a filter 11 which removes solid particles and then to a dryer 13 to remove moisture and water vapor. The gas then passes to a second filter 15 to remove all traces of non-gaseous products and thence to a branched outlet line 17, thence through line 18 to a pump 19. A recycle line 20 connects to a relief valve 21 so that as the gas is pumped part of it may be bypassed back to line 23 through the relief valve. The compressed gas goes through line 24 to a two-way switching valve indicated at 25, in normal operations, and thence to a flow regulator 27. Line 29 carries the gas from the flow regulator. A bypass line 30 is provided for feedback. Normal flow is from line 29 through a micro-regulating valve 31. The latter may be of any suitable type well known in the art. With this arrangement, a constant flow of sample gas will be maintained at the outlet of the micro-regulating valve for each setting of the valve position regardless of the upstream pressure. The valve setting is kept constant during a given set of experiments.

From the micro-valve 31 the gas to be analyzed flows through a line 33 to a flow meter 35 which imposes constant flow conditions on its outlet line 37. From the latter, the gas flows into the central zone 39 of a microporous ceramic cylinder 41. This cylinder constitutes a diffusion barrier. Outside the cylinder 41 is a packed annular zone 42 containing a selective adsorbent material suitable for taking up the particular gas to be adsorbed and measured. For $CO_2$ this packing may be particulate or fibrous sodium hydrate asbestos, e.g., "Ascarite," as mentioned above. Other materials, of course, will be substituted for detection of other gases, as has been explained.

A delta-pressure or differential pressure gauge 43 is connected by line 45 to the adsorbent packed zone 42 and by line 47 to the central zone 39 of the diffusion cylinder or barrier 41. The delta-pressure gauge indicates the difference in pressure of the gas sample in zone 39, where it still contains the component to be adsorbed, and the pressure in packed zone 42 where the gas has been adsorbed. Flow of the sample through the barrier is too slow to equalize the pressure; hence, the gauge gives an indication of the proportions of sorbate gas in the sample mixture.

The dryer 13 is filled with a suitable adsorbent material to take up water vapor, a preferable material being the dryer known as "Drierite." However, other equivalent moisture absorbent materials can be used. After drying, the dried gas passes to the relief valve in circuit with the pump 19 which is driven by a suitable motor pump M. A calibrating gas may be brought into the system through the three-way or two-position valve under control of switch 25 so that the system can be alternatively switched to the calibrating gas or the sample gas as desired.

The flow regulator is preferably of the constant differential type which is well known in the art. The cylindrical barrier 41 is provided with micro-pores of substantially uniform size. This may desirably be a microporous porcelain element having accurately controlled porosity, although other ceramic and even non-ceramic materials may be used. It is also desirable, although not always essential, that this element be also spray-coated with a very thin coat of a highly stable plastic film such as "Teflon," i.e., tetrafluoroethylene or equivalent material. This coating is desirably of a thickness from about 0.0002 to about .001 inch. The coating is employed to prevent adhesion of the adsorbent material such as "Ascarite" or "Hopcalite" to the barrier. This is desirable because the barrier is preferably surrounded with one of these adsorbent materials, particularly in the case where the apparatus is used mainly for analysis for carbon monoxide or carbon dioxide, or both.

As explained above, the differential pressure gauge 43 has one lead connected to the interior of the diffusion chamber 41 and the other lead connected to the adsorbent chamber 42. Since the pressure differential is a function, though not necessarily a direct measure, of the adsorption of the gas for which analysis is being made, this differential gives a direct or reasonably direct linear function indicating the percentage of gas adsorbed. The gauge may be calibrated for direct reading, e.g., in parts per million or percent by volume, if desired.

Referring now to FIG. 2, this system is generally the same in principle as that illustrated in FIG. 1 but the mechanical arrangement is somewhat different. It will be understood that filtering and drying means may be introduced ahead of the system shown in this figure if desired, as is shown in FIG. 1. In the system illustrated in FIG. 2 inert gas comes in through a selector valve 125 or, alternatively, a calibrating gas can be put through the same valve. An inert gas, when used, is led in through line 126 at the left. Calibrating or sample gas may be brought in at 127 at the right. In either case the gas flows through the valve 125 and passes to a pair of parallel flow meters or to a twin flow meter, indicated at 134 and 135. Suitable valves to control this flow are indicated at 134a and 135b, respectively. From the flow meter the lines 136a and 136b, respectively, conduct the gas to an eight-port gang shutoff valve indicated at 138. A micro-regulating valve 131 is attached through leads 132 and 132a to the eight-port gang valve 138. The sensor element 139 comprises an outer adsorbent chamber 140 and an inner or dummy chamber 142. A lead 150 from the gang valve 138 connects to the adsorbent chamber 140 whereas another lead 152 connects to the dummy chamber 142 to conduct inflowing gas thereto. An exit lead from the inner chamber, indicated at 154, returns to the gang valve 138 and an exit lead 156 also connects the adsorbent chamber 140 to the gang valve. It will thus be seen that all the various gas flows to and from the adsorbent chamber, including regulating of the pressure and the exhaust through line 158, are all controlled by the eight-port gang valve.

A differential pressure gauge 143 is connected through leads 144 and 144a, respectively, to the adsorbent chamber and to the inner or dummy chamber. In operation, the valve 125 will be switched to an inert gas first and the gang valve 138 will be left open for a short time, for example, about a minute, to clean the circuit of previously admitted materials. Thereafter, the micro-regulating valve 131 is adjusted until the two twin meters 134 and 135 read to show exactly the same flow. The delta pressure gauge will be checked and set to zero when the gang valve 138 is shut off.

After these adjustments have been made, the selector valve 125 is switched to either the calibrating or to the sample gas and the gang valve 138 will be opened for about one-half minute. Then valve 138 is shut off and the delta pressure can be read at the end of another half-minute to indicate the proportions of the material for which the gas sample is being analyzed.

Referring next to FIG. 3, there are shown typical results of the operation of the analyzer of FIG. 1, using "Ascarite" as the adsorbent and testing a waste gas, e.g., automative engine exhaust gas, for carbon dioxide. The various lines show results taken at different flow rates, using a maximum pore diameter in the barrier of 1.2 microns plus or minus 0.1 micron. The delta pressure is indicated in inches of water.

Figure 4:
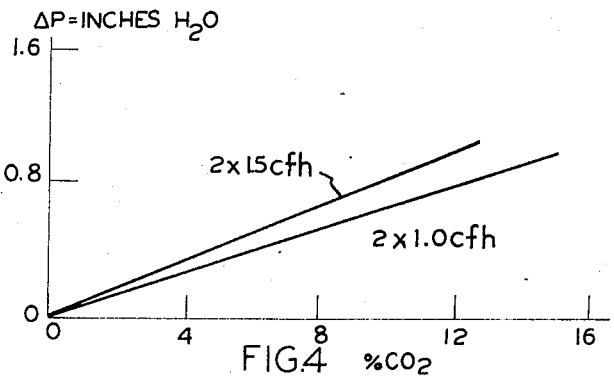

FIG. 4 shows another graph using as adsorbent the material sold under the trade name "Indicarb," in testing for percentage of carbon dioxide in an automobile exhaust gas, using the analyzer arranged as shown in FIG. 2.

Figure 5:
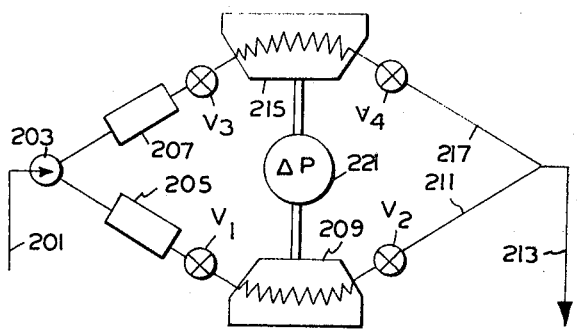
FIG. 5 illustrates the gas flow bridge system in a simple diagrammatic form.

Referring next to FIG. 5, the "gas flow" Wheatstone-type bridge system is illustrated. This does not require a diffusion barrier. Valves are used instead, here a stream of gas comes in from a line 201 at the left to a three-way valve 203 where the stream may be diverted or divided as desired. Assuming that the valve 203 is open, the stream flows through both flow meters 205 and 207. Assuming also that the pressure drop in these meters is negligible, the lower stream of gas passes to the dummy chamber 209 and then through outlet 211 to the exhaust line 213. The other stream passes into an absorbent chamber 215, filled with selective adsorbent. The sorbate gas is taken up. The remainder flows through line 217 to the exhaust. A differential pressure gauge 221 is connected across the two chambers to record the difference in pressure between them. The difference in pressure, of course, is equal, assuming static conditions, to the partial pressure of the sorbate gas. The static pressure, $\Delta P$, is measured by an instant and simultaneous shutoff of all intakes and outlets of both the dummy and the adsorbent chamber. This is accomplished by operating the valves $V_1$, $V_2$, $V_3$ and $V_4$ which are provided for this purpose all at once. In this case, there is no micro-porous element employed. The instrument illustrated in FIG. 5 is very simple and gives a direct reading. In some cases it may be difficult to establish the desired instantaneous cutoff in all four lines with the accuracy required for high grade analyses. For this reason, short lines of small diameter and quick-acting cutoff means are preferred.

Figure 6:
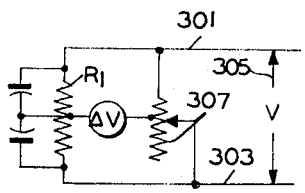
FIGS. 6 and 7 show a simplified equivalent electric circuit diagram for dynamic and static conditions, respectively.
Figure 7:
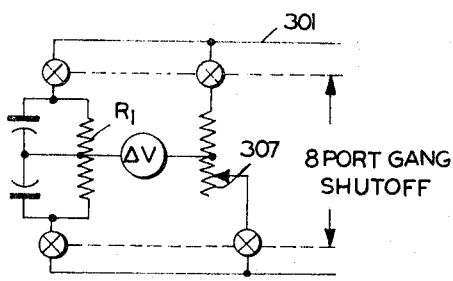

In order to illustrate the principle of the gas bridge, analogous and equivalent electrical circuit diagrams are shown in FIGS. 6 and 7. Under dynamic conditions current supplied by lines 301, 303 from power source 305 will be balanced when potentiometer 307 is adjusted as shown in FIG. 6. Under static conditions a differential voltage appears which requires readjusting the potentiometer 307 to achieve a balance in the bridge.

In order to accomplish the sudden shutoff of the valves of FIG. 5, an eight-port gang valve like that of FIG. 2, for example, and the selector valve such as shown at 125, FIG. 2, can all be operated by a quick acting rotary solenoid or rotary cylinder. The latter may be an air cylinder or a hydraulic cylinder, the device being timed so that intermittent readings for the analyses can be taken from the delta pressure indicator or by means of a recorder. It is preferred that the dummy chamber be built inside the adsorbent chamber, as is shown in FIG. 2, so that the temperature will be essentially the same in both chambers and any effect on the readings due to possible temperature differentials will be minimized or eliminated.

Figures 8, 9:
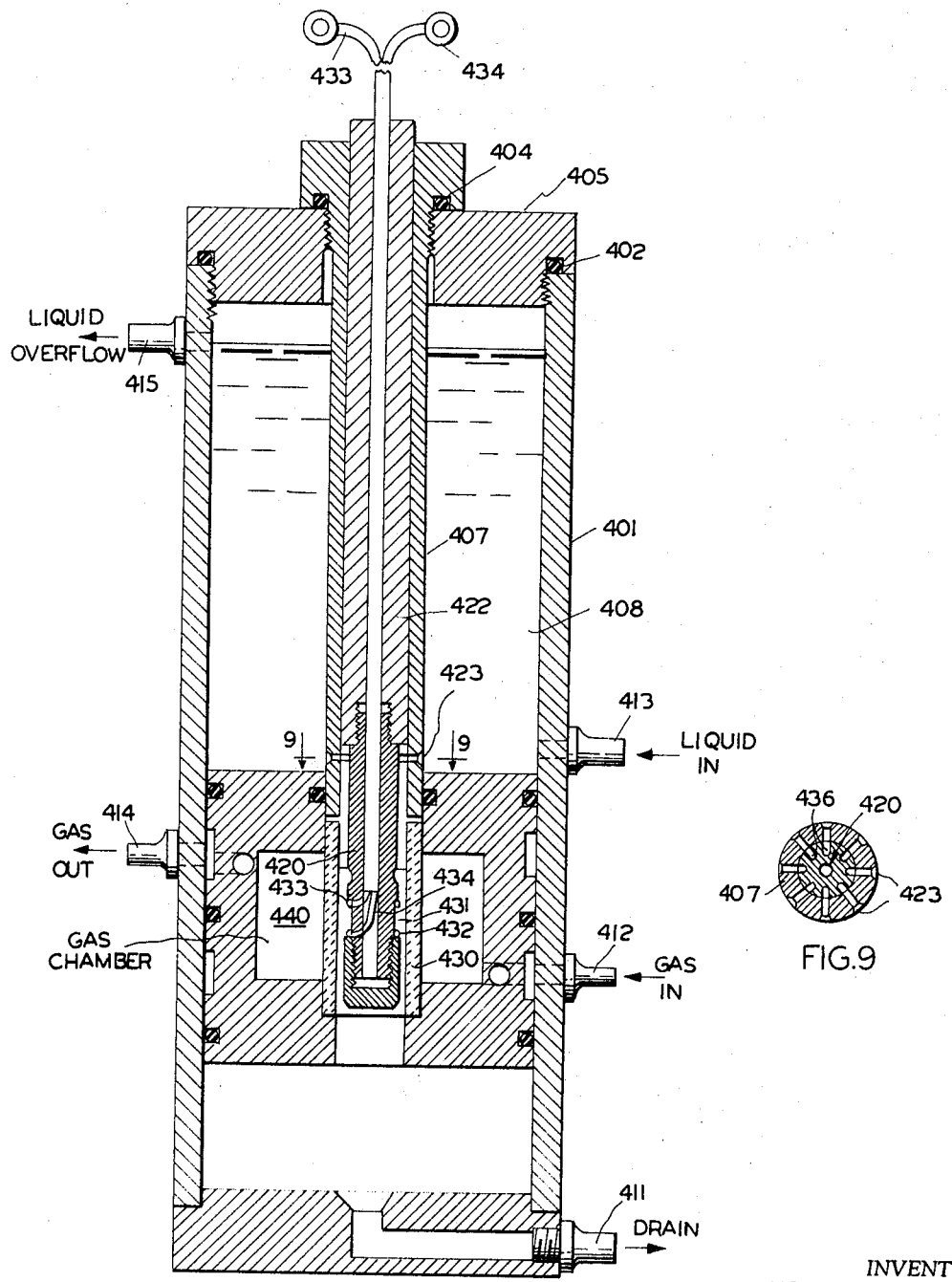
FIG. 8 shows another form of apparatus for performing the same general function and FIG. 9 is a detail section taken at 9—9, FIG. 8.

Referring now to FIG. 8, there is shown a somewhat different system comprising an inner tubular barrier element 407 placed inside an outer tubular container 401. This barrier member is attached to a head or cover element 405, which head can be made of any suitable material such as "Lucite." A seal is made between the cover 405 and the barrier 407 in the form of a gasket ring 404. Thus, an annular chamber 408 is provided around barrier 407. In this case, a liquid adsorbent is used to fill chamber 408.

The cover element 405 is adapted to be screwed into the tube 401, a suitable sealing gasket such as an "O-ring" being provided to insure a hermetic seal, as indicated at 402.

With this arrangement, the liquid adsorbent chamber 408 will be filled with a liquid adsorbent or catalyst material, depending on the type of test to be made. Liquid adsorbent, one type of which is described further below, is pumped into chamber 408. A constant pressure head is maintained, with overflow at 415 preferably being recycled. A liner 422 is placed inside the tube or sleeve 407. Radial holes 423 are drilled through the sleeve 407 and the slots 436 in core 422. These holes can be matched or mismatched by relative rotation to adjust the flow rate of liquid adsorbent through barrier. Various connections are provided for introducing and removing the sample gas and the liquid adsorbent and the waste liquid adsorbent, as indicated at 411, 412, 413, 414 and 415, the last one being the overflow for maintaining constant head in the container 408.

Sample gas flows into a sample chamber 440 through inlet 412 and flows out through vent 414. The flow through the openings 423 can be metered as desired by turning the sleeve 407 relative to core 422. The lower unit 430 of the sleeve 407 is separate from the upper part and is formed of porous polyethylene or equivalent. This member is substantially water-repellent. Since the tube 407 is surrounded with a preferentially adsorbent material, e.g., aqueous liquid in chamber 408, there is a small flow of this material through the adjusted metering radial openings 423 to slots 436 and vertically down thereafter. See FIG. 9. This flow produces a thin liquid film or hollow cylindrical column which forms within the narrow annular space 431 inside the porous tube 430 and outside the members. This space which defines the film or column is preferably between about 0.005 and 0.010 inch thick.

As the liquid film just mentioned is constantly being renewed, it takes up $CO_2$ and its electrical conductivity changes. A pair of probe rings 432 of black platinum are spaced apart along the space 431 and each is connected to an electrical lead 433, 434 which makes it possible to measure the electrical resistance of the thin hollow cylindrical body of fluid between the electrodes. This measurement is made by connecting the leads to a Wheatstone bridge, not shown in FIG. 8 but of conventional type, the unbalance of the bridge indicating a change of conductivity.

The liquid film or hollow column in space 431 is continuously removed and replaced. Its electrical conductivity responds rather rapidly to changes in the $CO_2$ concentration in gas or other elastic fluid mixtures coming into contact with the barrier 430, in chamber 440. The aqueous solution for selective $CO_2$ detection preferably contains about 5% KOH. To detect ammonia ($NH_3$), pure distilled water is preferred. For CO, e.g., in a mixture of $O_2$, $CO_2$, $N_2$, etc., a cupric chloride solution ($CuCl_2$) may be used, etc.

In the case of testing for carbon monoxide, using, for example, the oxidation catalyst "Hopcalite" which is a mixture of the oxides of manganese, cobalt, silver, and iron, two moles of carbon monoxide and one mole of oxygen will combine to produce two moles of $CO_2$. Thus, there is a pressure reduction, assuming oxygen is present in proportions sufficient to combine with the CO; in volume this amounts to reduction from three to two parts as far as these two components of the gas or elastic fluid mixture is concerned. The heat of combustion which is generated in this reaction may give misleading results, due to gas expansion. This heat can either be dissipated or its effect can be taken into account in the calibration.

In FIG. 10 a particularly simple apparatus is illustrated, one that is especially suitable for measuring the proportions of CO or $CO_2$ in automotive engine exhaust gases. It comprises a bottle or flask 500 containing a selective adhorbent or catalyst 502 such as "Hopcalite," for CO, or "Ascarite," for $CO_2$. A differential pressure gauge 504 has its two leads 506 and 508 connected respectively with the gas mixture supply line 509 (e.g., from an automotive exhaust system) and with the interior of receptacle 500. Lead 508 passes through a conventional gas-tight stopper 510 in the mouth of the flask or container.

The flask 500 has a side connection 512 which mounts a porous diffusion barrier 514. The latter may be of porcelain or of a micro-porous inert plastic material such as "Teflon." The pores should be reasonably uniform in size, preferably of such size and number as to permit all the gaseous elements to pass through at a rate less than the rate at which the gas to be detected will be absorbed by the absorbent material.

Assuming that the device of FIG. 10 is used to detect carbon dioxide in engine exhaust fumes, the gas from the automotive exhaust comes into line 509 and passes out at outlet 519. As it diffuses through the barrier 514, the $CO_2$, for example, is absorbed just about as fast as it comes into absorber zone 502 so that the total gas pressure in container 500 is reduced by almost the partial pressure of the $CO_2$ in the mixture. Static pressure at line 506 is greater than that at 508. Complete absorption usually is not practical or necessary. The differential pressure gauge 504 is preferably calibrated directly to show the proportions of $CO_2$ or CO, as desired.

The differential pressure gauge which is used in any of the modifications may be calibrated to read in parts per million, or in percentage, as desired. The instrument also may be provided with an alarm circuit, not shown, so that the system will give warning to persons nearby, e.g., before the poisonous gas content in an enclosed area becomes dangerously high, as might happen in the case of gases containing carbon monoxide.

The principles of this invention can be applied to many types of gases. The instrument is economical enough that it can be installed in places and for purposes where prior art devices would have been prohibitive in cost.

It will be understood that the instrument may be made in various mechanical forms and arrangements without departing from the spirit and purpose of the invention. It is intended to cover such variations, modifications and adaptations as would suggest themselves to those skilled in the art by the claims which follow.

What is claimed is:

1. In apparatus of the character described, the combination which comprises an outer tubular container, an inner tubular container annularly spaced from the outer container and comprising a diffusion barrier, means for supplying a liquid absorbent in the form of a thin film inside said inner tubular container, said thin film being in the form of a hollow cylinder, means for supplying a gaseous mixture which contains a detectable amount of a preferentially absorbable gas to the outer surface of said diffusion barrier whereby said mixture will diffuse through said barrier to said thin film and said preferentially absorbable gas will be absorbed by said film, and means for measuring electrical resistance changes in said thin film due to absorption of said gas, whereby the proportions of said absorbable gas may be indicated.

2. Combination according to claim 1 wherein the means for measuring electrical resistance is calibrated to read proportions of the absorbed gas directly.

3. Combination according to claim 1 wherein said means for measuring electrical resistance changes comprises a pair of electrodes in contact with the walls of said thin film cylinder.

References Cited

UNITED STATES PATENTS

| | | | |
|---|---|---|---|
| 1,825,024 | 9/1931 | Tandberg | 73—23 |
| 2,817,229 | 12/1957 | Beard | 73—23 |
| 3,040,561 | 6/1962 | Wright | 73—23 |
| 3,308,648 | 3/1967 | Moulton et al. | 73—23 |

RICHARD C. QUEISSER, *Primary Examiner.*

C. I. McCLELLAND, *Assistant Examiner.*